Oct. 26, 1971  K. R. PARKER ET AL  3,615,077
GAS COOLING TOWERS
Filed June 23, 1969

INVENTOR
KENNETH ROY PARKER, KENNETH DARBY and JOHN BEARDON
BY
ATTORNEY

United States Patent Office 3,615,077
Patented Oct. 26, 1971

3,615,077
GAS COOLING TOWERS
Kenneth Roy Parker, Sutton Coldfield, and Kenneth Darby and John Beardon, Harborne, Birmingham, England, assignors to Lodge-Cottrell Limited, Parade, Birmingham, England
Filed June 23, 1969, Ser. No. 835,652
Claims priority, application Great Britain, July 9, 1968, 32,724/68
Int. Cl. B01f 3/04
U.S. Cl. 261—118                                11 Claims

ABSTRACT OF THE DISCLOSURE

An evaporative gas cooling tower particularly for cooling waste gas of incineration prior to electro-precipitation comprises a divider member extending across its inlet duct to divide the gas entering the tower into two streams which meet and mix within the tower.

---

This invention is concerned with improvements in or relating to gas cooling towers.

In the cooling of gas, for example waste gas of combustion prior to electro-precipitation, it has been previously proposed for example to cool the gas by direct contact with water in a cooling tower. If the distribution of gas flow across the tower cross-section is not uniform along the length of the tower the efficiency of cooling may be low. This is particularly a problem where the gas entering the cooling tower is hot, for example above 450° C., when the use of conventional metal gas distribution devices in the tower is precluded unless special precautions are taken which are complicated and expensive. This arises for example in the incineration of municipal waste where the temperature of the waste gas of combustion is, for example, 1100° C.

It is an object of the invention to provide an improved gas cooling tower.

It is another object of the invention to provide an improved method of cooling gas.

The invention provides a gas cooling tower comprising an upright chamber adapted for flow of gas therealong for cooling of the gas, a transverse inlet duct for gas to be cooled which duct is oriented to lead gas into the chamber generally symmetrically with respect to the cross-section of the chamber, and a divider member extending across the duct adjacent the point of entry of the duct into the chamber adapted to divide gas entering the chamber into two streams which meet and mix within the chamber.

The invention also provides a gas cooling tower comprising a vertical upright chamber adapted for flow of gas therealong for cooling of the gas, a transverse inlet duct for gas to be cooled which duct is oriented to lead gas into the chamber generally symmetrically with respect to the cross-section of the chamber, a vertical upright divider member of uniform isosceles triangular cross-section extending symmetrically across the duct adjacent the point of entry of the duct into the chamber with an apex of the triangle leading with respect to the gas flow, said divider member being adapted to divide gas entering the chamber into two equal streams which meet and mix within the chamber, and a plurality of water sprays adapted to spray cooling water directly into the gas flowing along the chamber, said coolinng water being evaporated into the gas.

The invention also provides a gas cleaning plant comprising an electro-precipitator and a cooling tower according to the invention arranged to cool the gas prior to electro-precipitation in the electro-precipitator.

The invention also provides an incineration plant comprising an incinerator adapted for use in incinerating refuse and a gas cleaning plant according to the invention arranged to clean waste gas of combustion from the incinerator.

In a cooling tower embodying the invention and adapted for high temperature operation, for example above about 450° C., the chamber has a refractory lining, the inlet duct has a refractory lining, and the divider member is made of refractory material.

The gas is preferably cooled to a temperature between 200° C. and 350° C. prior to electro-precipitation.

There now follows a description, to be read with reference to the accompanying drawings of an incineration plant embodying the invention. This description, which is also illustrative of method aspects of the invention, is given by way of example of the invention only and not by way of limitation thereof.

Figure 1:
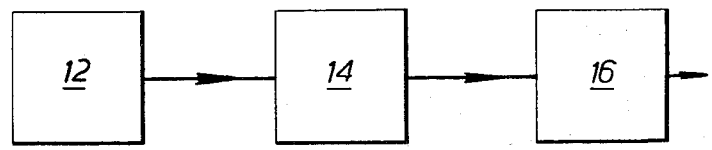
FIG. 1 shows a diagrammatic flow sheet of a plant embodying the invention.

The plant embodying the invention comprises an incinerator 12 adapted for use in incinerating municipal refuse and includes gas cleaning plant which comprises a gas cooling tower 14 and an electro-precipitator 16. In the operation of the plant municipal refuse is incinerated in the incinerator 12, waste gas of combustion from the incinerator 12 leaving the incinerator 12 at, for example 1100° C. is cooled prior to electro-precipitation to, for example, 300° C. in the cooling tower 14 and the cooled gas leaving the cooling tower 14 is cleaned by electro-precipitation of dust therefrom in the electro-precipitator 16. The cleaned gas from the electro-precipitator 16 is discharged to the atmosphere. The incinerator 12 and the electro-precipitator 16 are of known type per se, the electro-precipitator 16 being of the dry type.

The cooling tower 14 (FIGS. 2 and 3) comprises a vertical upright chamber 18 of circular cross-section and having a refractory lining 20 and in which are mounted water sprays 22. The tower 14 comprises a transverse inlet duct 24 of rectangular cross-section located at the bottom of the tower 14 and entering the chamber 18 a short distance below the sprays 22 which are thus located a short distance downstream of the duct 24; gas to be cooled enters the chamber 18 from the incinerator 12 via the duct 24; the duct 24 has a refractory lining 25. The tower 14 also comprises a transverse gas outlet duct 26 at the top of the tower 14 and leading to the electro-precipitator 16.

In the operation of the tower 14 the gas to be cooled enters the chamber 18 from the duct 24, flows upwardly along the chamber 18 in the countercurrent flow to water sprayed from the sprays 22 directly into the gas flowing along the chamber 18, the water being completely evaporated into the gas. The cooled gas containing the evaporated water leaves the chamber 18 along the duct 26 and passes to the electro-precipitator 16.

Figure 3:
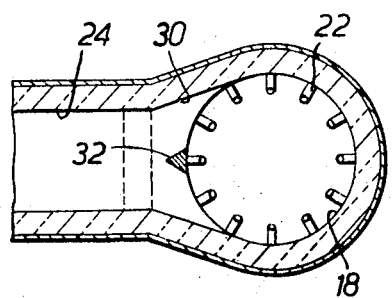
FIG. 3 shows a cross-sectional plan view corresponding to FIG. 2.

The inlet duct 24 is oriented to lead the gas into the chamber 18 generally symmetrically with respect to the cross-section of the chamber 18 (FIG. 3). The duct 24 slopes downwardly towards the chamber 18 and comprises a short end portion 30 which leads horizontally into the chamber 18. The end portion 30 diverges (in plan view) towards the chamber 18 while the remainder of the duct 24 is of uniform cross-section. The internal width of the end portion 30 at the point of entry into the chamber 18 is approaching the internal diameter of the chamber 18. A vertical upright divider member 32 of refractory material extends symmetrically across the end portion 30 of the duct 24 adjacent the point of entry of the duct 24 into the chamber 18, the divider member 32 being of uniform isosceles triangular cross-section (FIG. 3) with the base of the triangle lying generally on the inner peripheral boundary of the chamber 18 and the apex of the triangle leading with respect to the gas flow.

In the operation of the tower the member 32 divides the gas entering the chamber 18 into two equal streams which enter the chamber 18 generally tangentially with respect to the inner periphery of the chamber 18 and apparently flow around said inner periphery, meeting in the chamber 18 diametrically opposite the divider member 32 and mixing in the chamber 18 to provide substantially uniform gas flow distribution along the length of the chamber 18, thus giving the gas an actual contact time with respect to the water which approaches the theoretical value.

Figure 2:
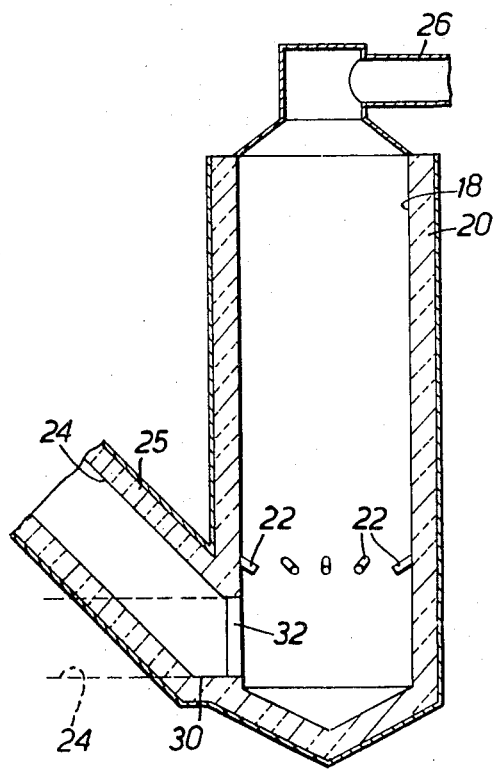
FIG. 2 shows a diagrammatic side view of a cooling tower of the plant.

One or more of the following modifications may be made:

(a) The inlet duct 24 leads horizontally into the end portion 30, as shown in chain line in FIG. 2.

(b) The inlet duct 24 is provided at the top of the tower 14 and the outlet duct 26 at the bottom of the tower 14, the gas flow being cocurrent with respect to the water flow, the inlet duct 24 slopes upwardly towards the chamber 18 or leads horizontally into the upper end portion of the chamber 18, and the sprays 22 are located at the top of the tower so that the inlet duct 24 enters the chamber 18 a short distance above the sprays 22 and again the sprays 22 are located a short distance downstream of the duct 24.

(c) The inlet duct 24 is of circular cross-section.

(d) The inlet duct 24 comprises in cross-section rectangular bottom and side walls and a part-circular upper wall.

We claim:

1. An evaporative gas cooling tower comprising an upright chamber along which a gas may flow, a plurality of water sprays adapted to spray cooling water directly into the gas flowing along the chamber, a transverse gas inlet duct connected to said chamber and oriented to introduce the gas into the chamber generally symmetrically with respect to the cross-section of the chamber, said inlet duct having a diverging cross-section as it approaches said chamber, and a divider member in said duct adapted to divide gas entering the chamber into two streams which meet and mix within the chamber, said divider member extending across the diverging portion of the duct adjacent the point of entry of the duct into the chamber and extending outwardly from the peripheral boundary of the chamber, and said divider member having diverging portions which correspond with the divergence of the duct.

2. A tower according to claim 1 wherein the divider member is upright.

3. A tower according to claim 1 wherein the divider member is of uniform triangular cross-section with an apex of the triangle leading with respect to the gas flow.

4. A tower according to claim 3 wherein a base of the triangle lies generally on an inner peripheral boundary of the chamber.

5. A tower according to claim 1 wherein the chamber is of circular cross-section.

6. A tower according to claim 1 wherein the inlet duct is of rectangular cross-section.

7. A tower according to claim 1 wherein the sprays are located in the chamber a short distance downstream of the inlet duct.

8. A tower according to claim 1 wherein the chamber has a refractory lining, the inlet duct has a refractory lining and the divider member is of refractory material.

9. Gas cleaning plant comprising an electro-precipitator and a cooling tower according to claim 1 adapted to cool the gas prior to electro-precipitation in the electro-precipitator.

10. Incineration plant comprising an incinerator adapted for use in incinerating refuse and gas cleaning plant according to claim 9 adapted to clean waste gas of combustion from the incinerator.

11. An evaporative gas cooling tower comprising a vertical upright chamber along which a gas may flow, a transverse gas inlet duct connected to said chamber and oriented to introduce gas into the chamber generally symmetrically with respect to the cross-section of the chamber, said inlet duct having vertical sides which diverge as said duct approaches the chamber, a vertical upright divider member of uniform isosceles triangular cross-section extending symmetrically across the duct adjacent the point of entry of the duct into the chamber with an apex of the triangle leading with respect to the gas flow and the base of the triangle lying generally on the peripheral boundary of the chamber, said divider member being adapted to divide gas entering the chamber into two streams which meet and mix within the chamber, and a plurality of water sprays adapted to spray cooling water directly into the gas flowing along the chamber so that said cooling water is evaporated into the gas.

References Cited

UNITED STATES PATENTS

| | | | |
|---|---|---|---|
| 2,101,112 | 12/1937 | Vicary | 261—F.G.W. |
| 2,440,860 | 5/1948 | Kalmeyer | 55—418 X |
| 2,463,757 | 3/1949 | Ely et al. | 261—F.G.W. |
| 2,646,263 | 7/1953 | Goldberg | 261—F.G.W. |
| 2,911,061 | 11/1959 | Petersen | 261—F.G.W. |
| 2,983,234 | 5/1961 | Reilly | 261—115 |
| 3,185,181 | 5/1965 | Demyan | 55—418 |
| 3,210,914 | 10/1965 | Eckert | 261—117 X |
| 3,420,508 | 1/1969 | Hurst et al. | 261—116 |
| 3,456,709 | 7/1969 | Vegeby | 261—117 X |
| 3,492,790 | 2/1970 | Ebert | 261—F.G.W. |

TIM R. MILES, Primary Examiner

U.S. Cl. X.R.

55—418; 261—Dig. 9